US005465844A

United States Patent [19]

Lee

[11] Patent Number: 5,465,844

[45] Date of Patent: Nov. 14, 1995

[54] WHEELED NESTABLE REFUSE CONTAINER

[75] Inventor: Norman C. Lee, Greensboro, N.C.

[73] Assignee: Compagne Plastic Omnium, Lyons, France

[21] Appl. No.: 234,550

[22] Filed: Apr. 28, 1994

[51] Int. Cl.$^{6}$ .............................. B62B 1/00

[52] U.S. Cl. .............................. 206/515; 220/629; 220/908

[58] Field of Search .............................. 220/908, 1.5, 629; 206/515; 16/29; 301/128

[56] References Cited

U.S. PATENT DOCUMENTS

| | | | |
|---|---|---|---|
| 335,557 | 2/1886 | Biersach | 16/29 |
| 3,346,271 | 10/1967 | Parsons . | |
| 3,575,284 | 4/1971 | Holt | 220/629 X |
| 4,057,872 | 11/1977 | Schmidt | 16/29 |
| 4,351,539 | 9/1982 | Rodolakis | 220/908 X |
| 4,420,168 | 12/1983 | Dewing | 220/900 X |
| 4,505,408 | 3/1985 | Sagol | 220/629 X |
| 4,878,592 | 11/1989 | Lee . | |
| 4,917,257 | 4/1990 | Edelhoff . | |
| 5,071,024 | 12/1991 | Delmerico et al. | 220/908 X |
| 5,106,113 | 4/1992 | Piacentini | 301/128 X |
| 5,163,577 | 11/1992 | Lee . | |
| 5,235,795 | 8/1993 | DeBusk | 220/908 X |
| 5,251,780 | 10/1993 | Lee . | |

*Primary Examiner*—Steven M. Pollard
*Attorney, Agent, or Firm*—Conley, Rose & Tayon

[57] ABSTRACT

A wheeled refuse container adapted to be nestable with like containers for storage and shipment comprises a container body having a closed lower end and an open upper end providing access to an interior refuse-receiving area. A pair of wheels are mounted to the container body rearwardly adjacent its lower end by a pivoting axle assembly for selective movement of the wheels between a retracted position, wherein the wheels do not interfere with nested insertion of the lower end of the container body into a like container, and an operable position, wherein the wheels are disposed laterally outwardly of the container body for stable rotational rolling support thereof.

14 Claims, 3 Drawing Sheets

WHEELED NESTABLE REFUSE CONTAINER

BACKGROUND OF THE INVENTION

The present invention relates generally to wheeled refuse containers and, more particularly, to such a refuse container particularly adapted to be nestable with like containers for storage and shipment.

Refuse containers, especially, for example, those employed in municipal trash collection programs, are typically equipped with wheels adjacent one side of the base of the refuse container body to enable users to tip the container into a tilted disposition supported on its wheels for easy rolling movement to and from a refuse collection location.

Given the relative size and bulk of typical wheeled refuse containers of the aforedescribed type, manufacturers typically design the bodies of such containers of a suitably tapered configuration to enable the container bodies to be nested with one another for compact storage and shipment, thereby to reduce required storage space and also to reduce shipping costs.

The provision of wheels on such containers is a complicating factor in designing such refuse containers to be nestable. On the one hand, it is desirable for the manufacturer to pre-mount the wheels to the container at the manufacturer's factory so that the containers can be shipped in a fully assembled condition and thereby eliminate any necessity for the purchaser to perform any assembly of the wheels to the container body. Disadvantageously, however, in order for the containers to still be nestable with the wheels mounted thereto, the wheels must be fully recessed within the "footprint", i.e., the plan dimensions, of the container base, which renders the container somewhat difficult and unstable to maneuver in rolling movement of the container on its wheels during use. Thus, to provide greater stability and ease of use of wheeled refuse containers, many manufacturers ship the container bodies and wheels in a disassembled condition, requiring the purchaser to mount wheels on each container body upon receipt, which is viewed by many purchasers as being equally disadvantageous.

SUMMARY OF THE INVENTION

It is accordingly an object of the present invention to provide a wheeled refuse container which avoids the disadvantages of the prior art described above. More particularly, an object of the present invention is to provide a wheeled refuse container which can be nested with like containers for compact storage and shipment with the wheels mounted to the container body. A more particular object of the present invention is to provide a novel means of mounting wheels to a refuse container body to be movable between retracted and operable positions to facilitate container nesting in the retracted position of the wheels and stable use of the container in the operable position of the wheels.

Briefly summarized, the refuse container of the present invention basically comprises a container body defining an interior refuse-receiving area, with a lower end of the container body being closed and an upper end of the container body being open to define an access opening into the interior refuse-receiving area. A pair of wheels are mounted to the container body adjacent its lower end by suitable means enabling selected movement of the wheels between a retracted position, wherein the wheels do not interfere with nested insertion of the lower end of the container body through the access opening and into the interior refuse-receiving area of a like container, and an operable position, wherein the wheels are disposed for rotational rolling support of the container body.

Preferably, the wheel mounting means is adapted to move each wheel into a disposition beneath the lower end of the container body in the retracted position of the wheels and into a disposition laterally outwardly of the lower end of the container body in the operable position of the wheels. By orientation of the wheels at a lateral outward spacing from the container body in the operable position, an enhanced degree of stability is provided to the container in comparison to conventional disposition of the wheels within the "footprint" of the lower end of the container to facilitate nesting.

In the preferred embodiment, each wheel is supported by an axle device for pivoting movement between the retracted and operable positions. For example, a preferred axle device comprises an axle shaft rotatably supporting a respective one of the wheels and a mounting shaft affixed substantially perpendicularly to the axle shaft and mounted to the container body for pivoting movement about an axis of the mounting shaft in a plane extending generally longitudinally of the container body.

The preferred construction of the container body includes a pair of undercuts at opposite sides of the lower end of the container body, with a first recess being formed generally in each undercut to rotatably receive the mounting shaft of one respective wheel and a second recess formed generally horizontally in each undercut substantially perpendicularly to the first recess to receive and retain the respective axle shaft in the operable position of the wheel. It is further preferred that a third recess be formed generally vertically in each undercut substantially perpendicularly to the first recess in order to receive and retain the respective axle shaft in the retracted position of the respective wheel.

According to another feature of the invention, the first recess in each undercut is configured to support the mounting shaft for selective axial movement lengthwise of the recess and the second recess is spaced outwardly from the third recess in relation to the container body for movement of the mounting shaft initially lengthwise along and then rotatably within the first recess during pivoting movement of the wheel from its retracted position to its operable position. In this manner, each wheel can be positioned within the footprint of the lower end of the container when the wheels are retracted and, then, when the wheels are pivoted into operable position, the more outward disposition of the axle-retaining second recess of each undercut enables the wheels not only to be positioned at a laterally outward spacing from opposite sides of the container body but also to be moved rearwardly of the container body to further enhance stability of the container during rolling movement as well as when rested on its lower end and wheels.

DESCRIPTION OF THE PREFERRED EMBODIMENT

Figure 1:
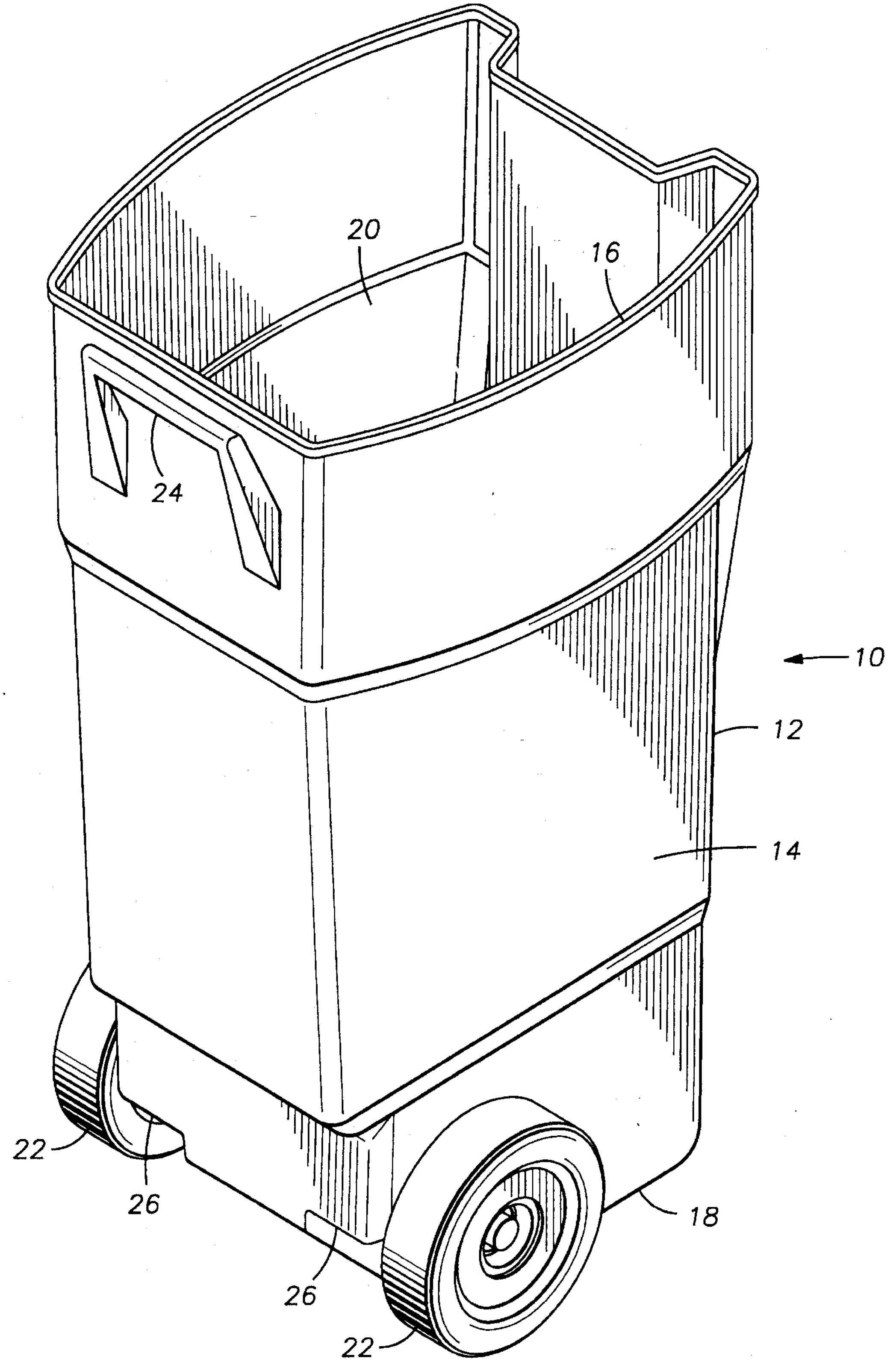
FIG. 1 is a perspective view of a wheeled refuse container in accordance with a preferred embodiment of the present invention.

Referring now to the accompanying drawings and initially to FIG. 1, a wheeled refuse container according to the preferred embodiment of the present invention is indicated generally at 10. The container 10 basically has a hollow main container body 12 of a generally rectangular construction formed of front, back, and side walls 14 terminating at their respective upper ends in an annular container rim 16 and merging at their respective lower ends with a bottom wall 18, to collectively define an interior refuse-receiving area 20 within the hollow container body 12. A pair of wheels 22 are rotatably mounted at opposite sides of the container 10 adjacent the junction between the rear wall 14 and the bottom wall 18, and a handle 24 is affixed to the container body 12 adjacent the upper end of the rear wall 14, to facilitate rolling movement of the container 10 from one point to another by utilizing the handle 24 to tilt the container body 12 onto the wheels 22 and then to pull or push the container body 12 while supported by its wheels 22. The container body 12 may be provided with a lid (not shown), either pivotably mounted to the container body 12 or removable therefrom, to selectively cover the open top of the container body 12 to enclose its interior receiving area 20.

Figure 2:
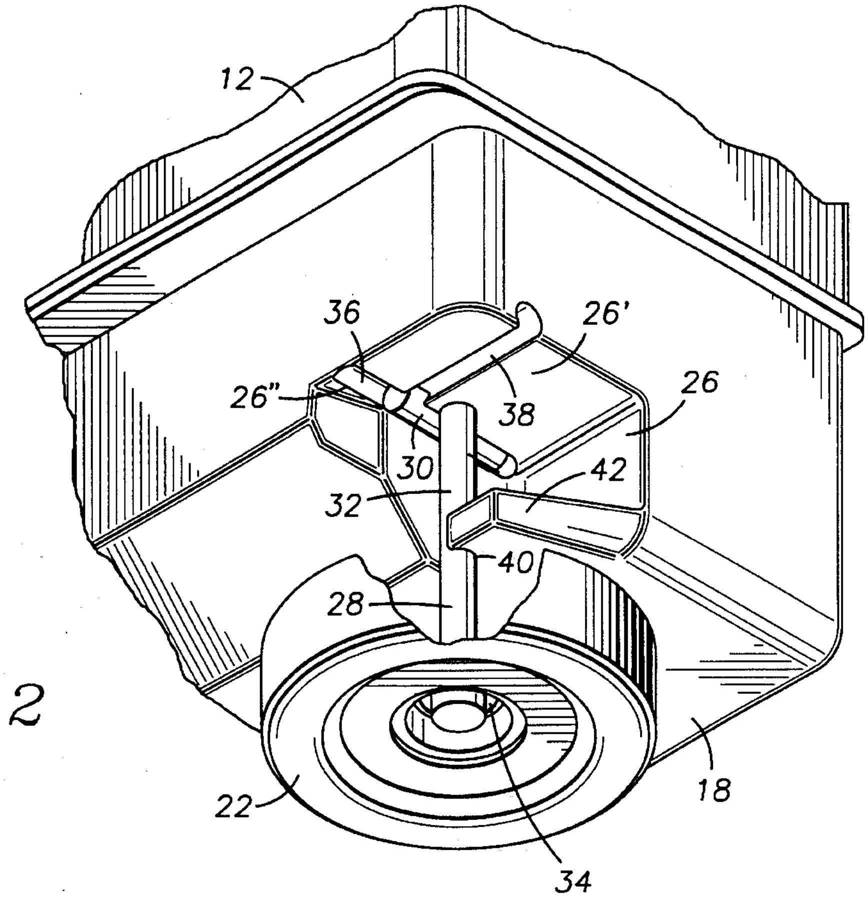
FIG. 2 is a bottom perspective view of the refuse container of FIG. 1, showing one wheel thereof in its retracted position for nesting.
Figure 3:
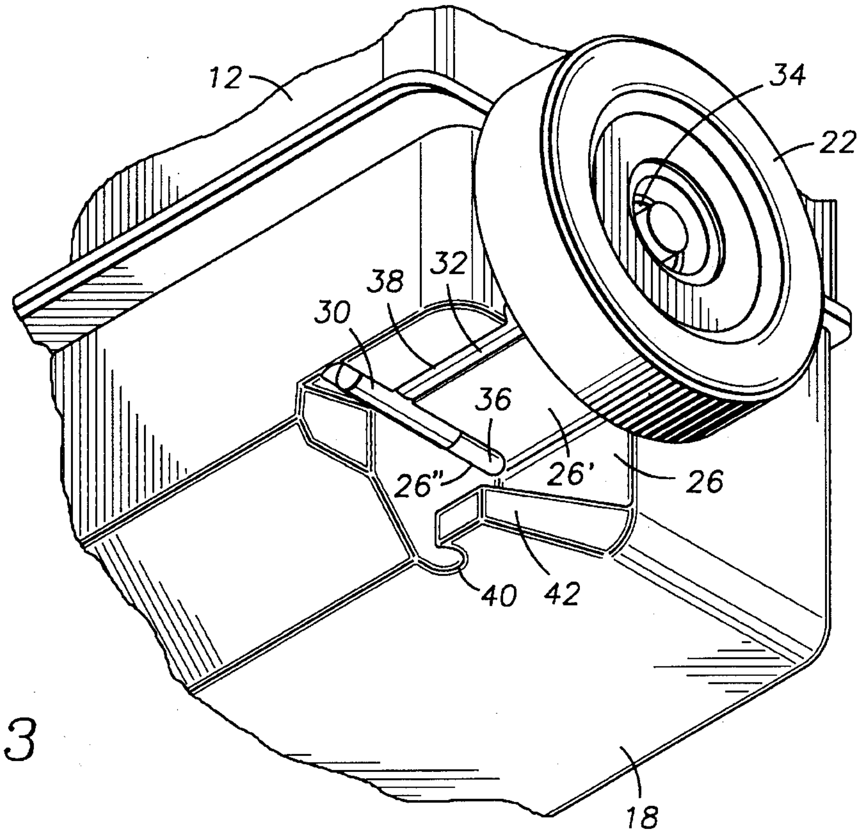
FIG. 3 is another bottom perspective view of the refuse container of FIG. 1, similar to FIG. 2, but showing the wheel pivoted into its operable position for use.

As best seen in FIGS. 2 and 3, the bottom wall 18 of the container body 12 is substantially flat to serve, in conjunction with the wheels, as a resting surface for upright disposition of the container body 12 thereon. As necessary or desirable, the bottom wall 18 may be provided with support feet or the like (not shown) for engagement with the ground or other surface on which the container is rested. A pair of recessed rectangular undercuts 26 are formed in the bottom wall 18 at opposite rearward sides thereof for mounting of the wheels 22 by means of respective axle assemblies indicated generally at 28. Each axle assembly 28 includes a cylindrical mounting shaft 30 with a cylindrical axle shaft 32 rigidly affixed midway along the length of the mounting shaft 30 to extend perpendicularly therefrom. One wheel is rotatably supported at the outward end of each axle shaft 32 and secured in place for rotation thereabout by a pair of retaining disks 34 secured to the axle shaft 32 at opposite sides of the wheel 22.

Within each undercut 26, a first cylindrical recess 36 is formed horizontally along the inwardmost corner 26" of the undercut 26 to extend from a rearwardly opening end of the recess 36 forwardly toward the front wall of the container body 12, for insertion into the recess 36 of the cylindrical mounting shaft 30 of one axial assembly 28, whereby the axle assembly 28 is supported for pivoting movement within the recess 36 about the axis of the mounting shaft 30 in a plane extending substantially longitudinally of the container body 12. A second cylindrical recess 38 is formed horizontally in the upper horizontal wall surface 26' of each undercut 26 perpendicularly to and intersecting with the first recess 36, the recess 38 being dimensioned to correspond to the cylindrical shape and diameter of the axle shaft 32 but with an entrance slot of a lateral dimension smaller than the diameter of the axle shaft 32 to provide a secure interference-type snap fit of the axle 32 into the recess 38 when the axle assembly 28 is pivoted upwardly to bring the axle shaft 32.into the recess 38 (see FIG. 3). A third cylindrical recess 40 is formed vertically in a protruding portion 42 of the bottom wall 18 partially overlying each undercut 26. The recess 40 is formed perpendicular with respect to the first cylindrical recess 36 but at a spacing from the recess 38 inwardly with respect to the overall "footprint" or plan dimensions of the bottom container wall 18, to receive the axle shaft 32 when the respective axle assembly 28 is pivoted downwardly (see FIG. 2).

Figure 4:
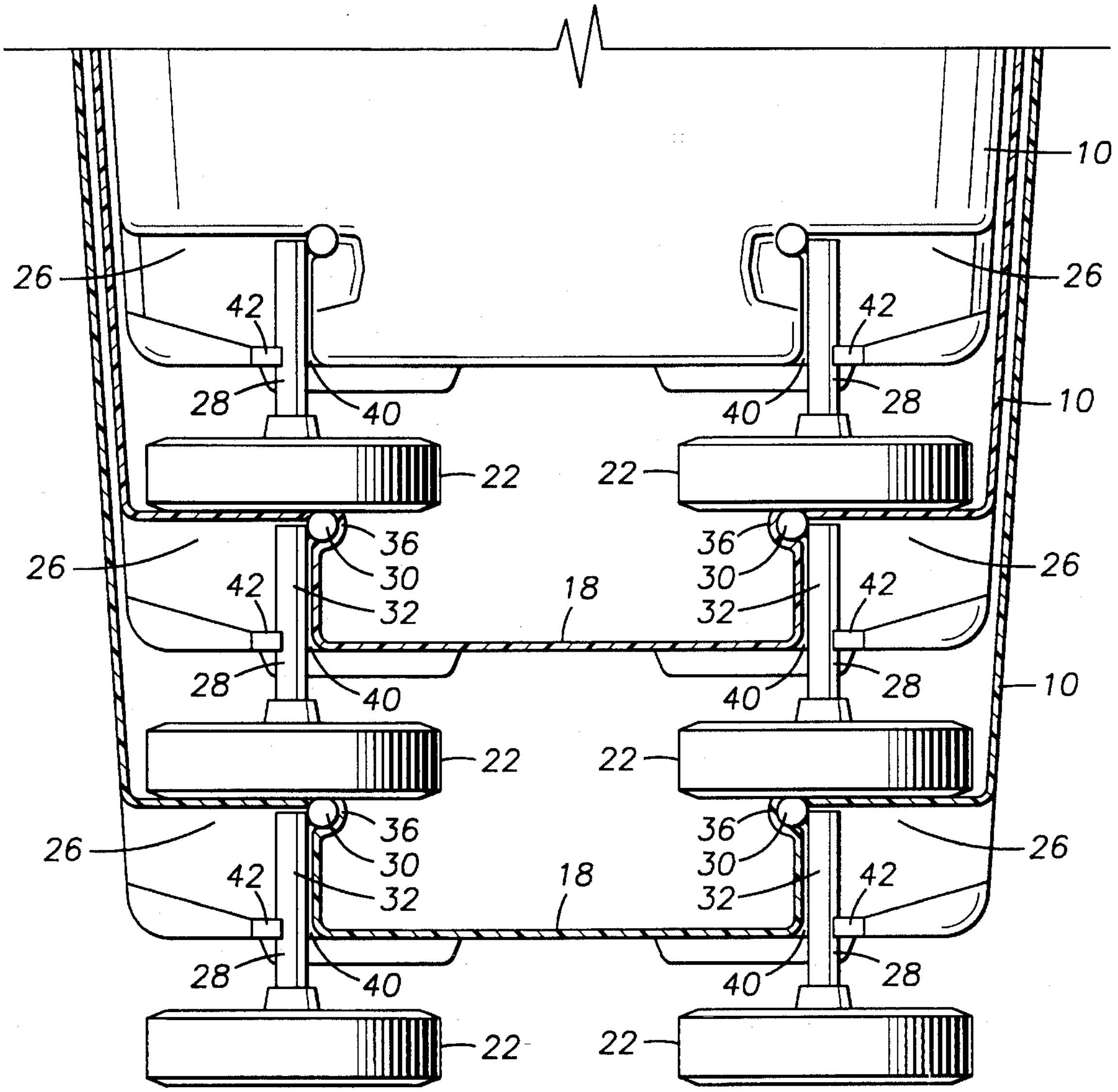
FIG. 4 is a side elevational view, partially broken away, of several refuse containers according to the present invention, shown nested with one another with their respective wheels pivoted into their retracted positions.

The operation and use of the refuse container 10 may thus be understood with additional reference to FIG. 4. For storage and shipment of the refuse container 10, its wheels 22 are pivoted into the retracted position depicted in FIG. 2 by sliding the mounting shaft 30 of each axle assembly 28 inwardly along its receiving recess 36 for pivoting of the axle shaft 32 downwardly until received and retained in the corresponding recess 40. In this retracted position of the wheels 22, the wheels are completely disposed within the overall footprint of the container body 12, enabling the lower end of the container body 12 to be inserted through the open top and into the interior receiving area 20 of the container body 12 of a like refuse container 10 until the retracted wheels 22 rest on the inward surfaces of the undercuts 26 of the other container body 12. In this manner, the containers 10 may be readily nested with one another in a compact arrangement for efficient storage and shipment while occupying the smallest possible volume, as depicted in FIG. 4.

When the container 10 is to be placed into use, each axle assembly 28 is slidably moved rearwardly within its supporting recess 36 to disengage the axle shaft 32 from the retaining recess 40 and to position the axle shaft 32 adjacent the recess 38, whereupon the axle shaft 32 and its wheel 22 is pivoted upwardly to snap the shaft 32 into the associated recess 38. In this manner, the axle assemblies 28 and their associated wheels 22 are secured in an operable position wherein the wheels 22 are disposed at a laterally outwardly spacing from the side walls and adjacent the rear wall of the container body 12, as depicted in FIGS. 1 and 3. In such operable disposition of the wheels 22, the wheels 22 provide optimal stability to the container during rolling movement and, in conjunction with the flat bottom wall 18, enable the container 12 to rest securely on a flat surface when not in use.

To provide security against unauthorized removal of the wheels 22 and axle assemblies 28 from the container 10, the rearwardly open end of each recess 36 can be closed by a plug or the like (not shown) inserted by the manufacturer after insertion of the axle assemblies 28. The plugs may serve the additional benefit of aiding in the proper positioning of each axle assembly for pivoting into the operable position of FIG. 3.

As will thus be understood, the disadvantages of the prior art described above are completely obviated by the present invention. The refuse containers 10 may be fully assembled by the manufacturer at the factory, with the wheels 22 and supporting axle assemblies 28 pre-mounted to the container body 12, yet retracted for convenient compact nesting during shipment and storage. When received by a purchaser, the purchaser is not required to perform any final assembly of the container 10 but rather need only pivot the axle assemblies 32 into the operable position of FIG. 3, whereupon the container is ready for use and the wheels 22 are disposed to provide much enhanced stability over conventional nestable wheeled containers.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A wheeled container adapted to be nestable with like containers for storage and shipment, comprising a container body defining an interior receiving area, a lower end of the container body being closed and an upper end of the container body being open to define an access opening into the interior receiving area, and axle means mounting the wheels to the container body, adjacent the lower end for selective movement of the wheels between a retracted position, wherein the wheels are disposed beneath the lower end of container body and do not interfere with nested insertion of the lower end of the container body through the access opening and into the interior receiving area of a like container, and an operable position, wherein said axle means is horizontally oriented and the wheels are disposed laterally outwardly of the lower end of the container body for rotational rolling support of the container body.

2. A wheeled nestable container according to claim 1 wherein the wheel mounting means comprises means for releasably retaining the wheels in the operable position.

3. A wheeled nestable container according to claim 2 wherein the wheel mounting means comprises means for releasably retaining the wheels in the retracted position.

4. A wheeled nestable container according to claim 1, wherein the wheel mounting means comprises means for moving each wheel into a disposition beneath the lower end of the container body in the retracted position of the wheels and into a disposition laterally of the lower end of the container body in the operable position.

5. A wheeled nestable container according to claim 4 wherein the wheel moving means locates the wheels at a laterally outward spacing from the container body in the operable position.

6. A wheeled nestable container according to claim 4 wherein the wheel moving means comprises means for pivoting each wheel between its retracted and operable positions.

7. A wheeled nestable container according to claim 6 wherein the wheel moving means comprises a pair of axle means for rotatably supporting the respective wheels, each axle means being mounted to the container body for pivoting movement in a plane extending generally longitudinally of the container body.

8. A wheeled container adapted to be nestable with like containers for storage and shipment, comprising:

a container body defining an interior receiving area, a lower end of the container body being closed and an upper end of the container body being open to define an access opening into the interior receiving area;

axle means mounting the wheels to the container body adjacent the lowcr end for selective movement of the wheels between a retracted position, wherein the wheels are disposed beneath the lower end of the container body and do not interfere with nested insertion of the lower end of the container body through the access opening and into the interior receiving area of a like container, and an operable position, wherein said axle means is horizontally oriented the wheels are disposed for rotational rolling support of the container body, the wheel mounting means comprising means for releasably retaining the wheels in the operable and the retracted positions;

the wheel mounting means comprising means for moving each wheel into a disposition beneath the lower end of the container body in the retracted position of the wheels and into a disposition laterally of the lower end of and at a laterally outward spacing from the container body in the operable position;

the wheel moving means comprising means for pivoting each wheel between its retracted and operable positions; and the wheel moving means comprising a pair of axle means for rotatably supporting the respective wheels, each axle means being mounted to the container body for pivoting movement in a plane extending generally longitudinally of the container body 3, each axle means comprising an axle shaft rotatably supporting a respective one of the wheels and a mounting shaft affixed substantially perpendicularly to the axle shaft and mounted to the container body for pivoting movement about an axis of the mounting shaft.

9. A wheeled container adapted to be nestable with like containers for storage and shipment, comprising:

a container body defining an interior receiving area, a lower end of the container body being closed and an upper end of the container body being open to define an access opening into the interior receiving area, the container body including a pair of undercuts at opposite sides of the lower end of the container body, a first recess being formed generally horizontally in each undercut for rotatably receiving the mounting shaft of the respective wheel and a second recess being formed generally horizontally in each undercut substantially perpendicularly to the first recess for receiving and retaining the respective axle shaft in the operable position of the wheel;

means mounting the wheels to the container body adjacent the lower end for selective movement of the wheels between a retracted position, wherein the wheels do not interfere with nested insertion of the lower end of the container body through the access opening and into the interior receiving area of a like container, and an operable position, wherein the wheels are disposed for rotational rolling support of the container body, the wheel mounting means comprising means for releasably retaining the wheels in the operable and the retracted positions;

the wheel mounting means comprising means for moving each wheel into a disposition beneath the lower end of the container body in the retracted position of the wheels and into a disposition laterally of the lower end of and at a laterally outward spacing from the container body in the operable position;

the wheel moving means comprising means for pivoting each wheel between its retracted and operable positions: and the wheel moving means comprising a pair of axle means for rotatably supporting the respective wheels, each axle means being mounted to the container body for pivoting movement in a plane extending generally longitudinally of the container body 3, each axle means comprising an axle shaft.

10. A wheeled nestable container according to claim 9 wherein a third recess is formed generally vertically in each undercut substantially perpendicularly to the first recess for receiving and retaining the respective axle shaft in the retracted position of the respective wheel.

11. A wheeled nestable container according to claim 10 wherein the first recess supports the mounting shaft for selective axial movement lengthwise of the recess and the second recess is spaced outwardly from the third recess in relation to the container body for movement of the mounting shaft initially lengthwise along and then rotatably within the first recess during pivoting movement of the wheel from its retracted position into its operable position.

12. A wheeled container comprising:

a container body defining an interior receiving area, a lower end of the container body being closed and an upper end of the container body being open to define an access opening into the interior receiving area; and axle means for mounting the wheels to the container body adjacent the lower end for selective movement of the wheels between an operable position and a retracted position, wherein the axle is horizontally oriented in the operable position and the wheels are substantially perpendicular to their position in the operable position and are disposed beneath the lower end of the container body.

13. A wheeled nestable container according to claim 12 wherein the wheels are selectively moveable between the operable and retracted positions by means of a device for pivoting the wheels between the retracted and operable positions.

14. A wheeled container adapted to be nestable with like containers for storage and shipment, comprising a container body defining an interior receiving area, an upper end of the container body being open to define an access opening into the interior receiving area and, a lower end of the container body being closed and having plan dimensions which constitute the footprint of the container, and axle means mounting the wheels to the container body adjacent the lower end for selective movement of the wheels between a retracted position, wherein the wheels are disposed beneath the lower end of the container body and are maintained within the footprint for nested insertion of the lower end of the container body through the access opening and into the interior receiving area of a like container, and an operable position, wherein the axle is horizontally oriented and the wheels are disposed outside of the footprint for rotational rolling support of the container body.

* * * * *